(12) United States Patent
Rawlinson et al.

(10) Patent No.: US 9,210,549 B2
(45) Date of Patent: Dec. 8, 2015

(54) TRACKING A MOBILE UNIT IN A HOUSING FACILITY FOR MOBILE UNITS

(71) Applicant: International Business Machines Corporation, Armonk, NY (US)

(72) Inventors: Andrew Rawlinson, Melbourne (AU); Xing Zhi Sun, Beijing (CN); Ziyuan Wang, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 14/133,985

(22) Filed: Dec. 19, 2013

(65) Prior Publication Data

US 2015/0181389 A1    Jun. 25, 2015

(51) Int. Cl.
*H04W 24/00* (2009.01)
*H04W 4/04* (2009.01)

(52) U.S. Cl.
CPC ...................................... *H04W 4/04* (2013.01)

(58) Field of Classification Search
CPC ......... G08G 1/14; G08G 1/141; G08G 1/142; G08G 1/143; G08G 1/145; G08G 1/146; G08G 1/147; G08G 1/148; G08G 1/149; H04W 4/04; H04W 4/008; H04W 64/00
See application file for complete search history.

(56) References Cited

U.S. PATENT DOCUMENTS

| 8,952,786 | B1 * | 2/2015 | Steege et al. ................. 340/10.1 |
| 2004/0252034 | A1 * | 12/2004 | Slemmer et al. ............ 340/932.2 |
| 2006/0187043 | A1 * | 8/2006 | Allen .......................... 340/572.1 |
| 2008/0249899 | A1 * | 10/2008 | Nasser ............................ 705/28 |
| 2012/0077475 | A1 | 3/2012 | Holcomb et al. |
| 2012/0086558 | A1 * | 4/2012 | Teske ........................... 340/10.4 |
| 2012/0092189 | A1 * | 4/2012 | Jordan ........................ 340/932.2 |
| 2012/0130777 | A1 | 5/2012 | Kaufman |
| 2012/0280836 | A1 | 11/2012 | Roesner |
| 2013/0103200 | A1 | 4/2013 | Tucker et al. |
| 2013/0141252 | A1 | 6/2013 | Ricci |
| 2013/0166333 | A1 * | 6/2013 | Chang et al. ....................... 705/5 |
| 2014/0028447 | A1 * | 1/2014 | Howard ........................ 340/10.6 |
| 2014/0266804 | A1 * | 9/2014 | Asadpour .................. 340/932.2 |

FOREIGN PATENT DOCUMENTS

DE    102012204463 A1    10/2012

OTHER PUBLICATIONS

G. Ostojic et al, "Implementation of RFID Technology in Parking Lot Access Control System", 2007 1st Annual RFID Eurasia, 2007.
R. Derakhshan et al., "RFID Data Management: Challenges and Opportunities", 2007 IEEE International Conference on RFID, Mar. 26-28, 2007, pp. 175-182.
A. Kianpisheh et al., "Smart Parking System (SPS) Architecture Using Ultrasonic Detector", International Journal of Software Engineering and Its Applications, vol. 6, No. 3, Jul. 2012, pp. 51-58.
Z. Pala et al., "Smart Parking Applications Using RFID Technology", RFID Eurasia Conference, 2007.
Mell et al., "The NIST Definition of Cloud Computing", Version 15, Oct. 7, 2009, National Institute of Standards and Technology, Information Technology Laboratory.

* cited by examiner

*Primary Examiner* — Ajit Patel
(74) *Attorney, Agent, or Firm* — Michael J. DiCato; Louis J. Percello

(57) ABSTRACT

A mobile unit in a housing facility for mobile units may be tracked by activating a first reading device at a first location of the housing facility upon detecting a first mobile unit arriving at or departing from the first location, wherein the first mobile unit has a first tag having an identification code (ID) readable by the first reading device. A set of readings may be performed by the first reading device to read a set of tag IDs during a time interval. Upon an ending of the time interval, tag IDs, in the set of tag IDs, that correspond to the first tag ID are identified based on the set of readings. A record is updated to associate the first tag ID with the first location.

17 Claims, 8 Drawing Sheets

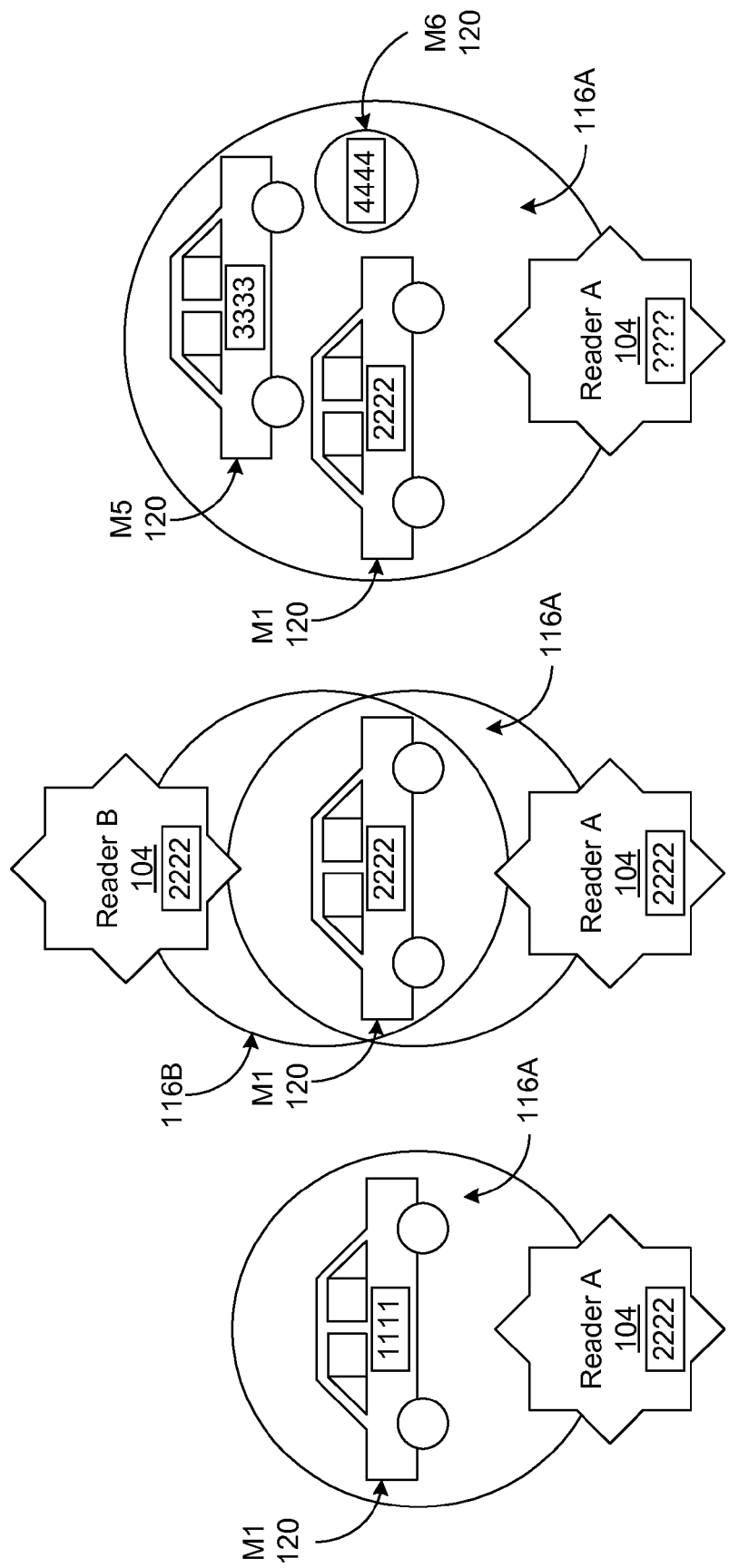

US 9,210,549 B2

TRACKING A MOBILE UNIT IN A HOUSING FACILITY FOR MOBILE UNITS

FIELD OF THE INVENTION

The present disclosure generally relates to the field of electronic monitoring systems, and more particularly to tracking a mobile unit in a housing facility for mobile units.

BACKGROUND

Automated tracking and monitoring a mobile unit, for example, a car, in a housing facility for mobile units, for example, a parking garage, provides many challenges. Existing automated solutions deployed in, for example, a car park or a warehouse, include a sensor system that can determine if a space in the car park or in the warehouse is occupied or unoccupied. However, such systems may not provide for automatic dynamic tracking of a mobile unit in that space. It may be desirable, therefore, to dynamically track a mobile unit in such a space.

BRIEF SUMMARY

Embodiments of the present disclosure provide a method, system, and computer program product for tracking a mobile unit in a housing facility for mobile units. In response to receiving a signal from a detector associated with a first location, a first reading device having a reading range that includes at least the first location is activated. A first set of tag IDs from the first reading device, read during a first time interval, is received. In response to determining that one of the tag IDs in the first set of tag IDs can be associated with the first location, a record is updated to record an association of the one tag ID with the first location.

A first reading device is activated at a first location of the housing facility for mobile units upon detecting a first mobile unit arriving at or departing from the first location, wherein the first mobile unit has a first tag readable by the first reading device. A set of readings is performed, by the first reading device, of a set of ID tags during a time interval, wherein each ID tag corresponds to at least one mobile unit. Upon an ending of the time interval, an identification is made as to which ID tags in the set of tags correspond to the first tag based on the set of readings, and a record is updated to associate the first ID tag with the first location.

BRIEF DESCRIPTION OF THE SEVERAL VIEWS OF THE DRAWINGS

FIGS. 3A-C are schematic block diagrams depicting problem scenarios, in a mobile unit housing facility, solved by embodiments of the present disclosure.

DETAILED DESCRIPTION

Figure 1:
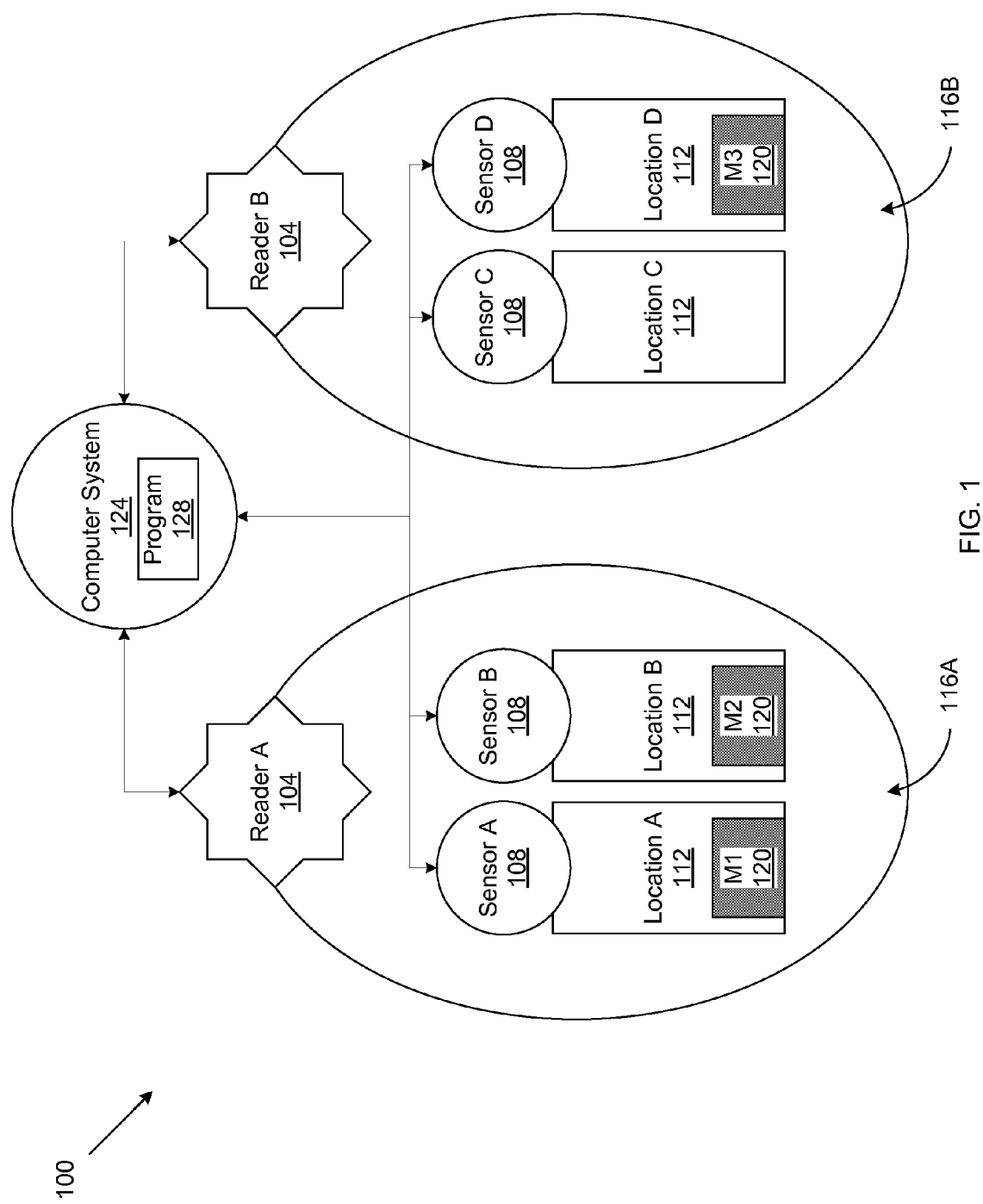
FIG. 1 is a schematic block diagram depicting a mobile unit housing facility and its components, according to an aspect of the present disclosure.

FIG. 1 is a schematic block diagram of an exemplary housing facility 100 for storing one or more mobile units 120, including, for example, mobile units M1, M2 and M3. Each mobile unit 120 may include a tag (not shown) that may be used to track the mobile unit 120, as described in connection with embodiments of the present disclosure, below. The facility 100 may include one or more housing locations 112, for example, housing locations A-D. Each location 112 may be associated with a corresponding sensor 108, such as Sensors A-D, that are capable of detecting a mobile unit 120 arriving at or departing from a location 112. The facility 100 may further include one or more reading devices 104, for example, Readers A-B, that are capable of detecting mobile units 120 located in a coverage area 116, for example, coverage areas 116A and 116B, respectively. The readers 104 may detect the mobile units 120 via their respective tags. Each location 112 may be assigned a main or primary reader 104.

Each of the readers 104 and the sensors 108 may be in communication with a computer system 124 having a tangible storage device on which may be a program 128.

According to exemplary and non-limiting embodiments of the present disclosure, components of the facility 100 may be, as follows:

The facility 100 may be, for example, a vehicle park (such as a car park or a garage) or a warehouse.

The locations 112 may be, for example, parking slots in a garage for vehicles; or slots, shelves, or racks in a warehouse for storing packaged (e.g., boxes, crates) or unpackaged goods.

The mobile units may be, for example, a car, a motorcycle, or any other vehicle; a pallet, crate, box, package, container, goods, or other grouping of objects or individual objects in a warehouse. The tag of each such mobile unit may be, for example, a radio frequency identification (RFID) tag. Each tag may include a unique ID value, which may be, for example, a unique string of characters or numbers or a combination thereof. RFID tag types include, without limitation, the following types: passive, active, or battery-assisted passive. RFID tags may include an integrated circuit and an antenna.

The sensor associated with each location 112 may be, for example, an infrared sensor, or a weight sensor.

The readers 104 may be, for example, an RFID reader that is capable of reading or detecting RFID tags within a corresponding coverage area, for example, area 116. RFID readers may transmit an encoded radio signal to interrogate RFID tags, which may receive the signal and respond with identification and other information. RFID reader types may include, without limitation: passive reader active tag (PRAT) type; active reader passive tag (ARPT) type; and active reader active tag (ARAT) type. RFID readers may be fixed or mobile.

An exemplary embodiment of the present disclosure may be a garage facility 100. A set of sensors 108 may each be associated with respective locations 112 in the facility 100, such as parking locations. The computer system 124 of the facility 100 may maintain a mapping table of all parking locations in the garage. For example, each parking location 112 may have a corresponding record in the mapping table, stored on the computer system 124, containing a Boolean value, indicating whether the location is occupied or empty, based on information received from an associated sensor 108. The corresponding data schema, which may be stored on a tangible storage medium of the computer system 124, may be, for example:

For each location 112: Map{LocationID, X-coordinate, Y-coordinate}, where LocationID is an identifier of the parking location 112, X- and Y-coordinates are, for example, row and column numbers of the parking location 112.

Current state of each parking location 112: SensorData{LocationID, Time, Occupied, CarRFID}, where SensorData is associated with the sensor 108 at the location 112 identified by LocationID; Time is a timestamp of when a vehicle arrives at the location associated with LocationID, or is Null when the location is empty; Occupied is a Boolean indicator indicating that the location associated with LocationID is occupied; and CarRFID is the RFID identifier value of an RFID tag of the parked vehicle M 120 (i.e., the mobile units M1-n).

Each of the readers 104 in this embodiment may be, for example, an RFID reader. The program 128 may record a parking time for each vehicle whose RFID tag is detected by an RFID reader. In one embodiment, the data associated with the reads may be stored by program 128 in a table RFIDPayment{CarRFID, TimeIn, TimePay}, where CarRFID corresponds the to the RFID of the vehicle; TimeIn refers to the time of parking at a particular location; and TimePay refers to the time when a payment is made corresponding to the parking location 112 and/or the RFID tag.

A set of RFID readers 104, which may be stationary or mobile, may be installed in the garage 100. The RFID readers 104 may be capable of monitoring or reading an RFID tag of a vehicle 120 within their coverage range. In exemplary embodiments of the present disclosure, deployment of the readers may be according to the following three types, based on a mapping between a given RFID reader 104 and its corresponding location(s) 112: 1:1, 1:n, m:n. In a 1:1 type mapping, each RFID reader 104 may be configured to read an RFID tag at a single location 112, and each location 112 may be in a detectable range 116 of a single RFID reader 104. In the 1:n mapping, one RFID reader 104 may detect RFID tags in multiple parking locations 112, and one parking location 112 may be in the detectable range 116 of more than one RFID readers 104. In the m:n mapping, m RFID readers 104 may detect RFID tags in n locations 112, and m parking locations 112 may be in the detectable range 116 of n RFID readers 104.

For any two parking locations 112 $l_i$ and $l_j$, $RS_i$ and $RS_j$ may be the sets of RFID readers 104 that can detect location 112 $l_i$ and $l_j$, respectively. The deployment of RFID readers 104 may be called distinguishable if $RS_i \neq RS_j$. If the deployment is distinguishable, the location 112 of any parked vehicle M1 120 may always be determined by readings of RFID readers 104.

The data schema for recording data of RFID readers 104 may be: RFIDReader{ReaderID, LocationID, isMainReader}, where ReaderID is an identifier of the corresponding RFID reader 104; LocationID is the ID of the corresponding parking location(s) 112 detectable by the RFID reader 104; and isMainReader indicates if the RFID reader 104 is designated as the main or the primary RFID reader 104 of the corresponding parking location. When an RFID reader 104 (or any other type of reader 104) performs a reading of an RFID tag, the corresponding RFID tag information may be communicated to the program 128.

The program 128 may record RFID readings, read by the readers 104, in a table (not shown) stored on a tangible storage medium of the computer system 124. The table may have the following data schema: RFIDData{ID, ReaderId, CarRFID, Time}, which indicates that a vehicle's 120 RFID tag CarRFID is recorded by the RFID reader 104 ReaderID at time Time.

In some embodiments of the present disclosure, there may be no 1:1 matching of a mobile unit 120 to a location 112. These circumstances may include, for example, a single mobile unit 120, having a distinct tag, occupying more than one location 112. Since the mobile unit 112 occupies more than one location 112, it may trigger more than one sensor 108 (because each location 112 may have its own sensor 108). For example, a large vehicle in a car park may be parked such that it occupies more than one parking slot. In this example, the large vehicle may arrive at Locations A-C 112, triggering Sensors A-C 108. Although the vehicle itself occupies three locations 112, its tag may be in the coverage area 116B of Reader B 104, but not the coverage area 116A of Reader A 104.

In the above example where there is no 1:1 matching of a mobile unit 120 and a location 112 because a mobile unit occupies more than one location 112, embodiments of the present disclosure may additionally include a location area (not shown) corresponding to more than one location 112 in the coverage area 116. In these embodiments, a mobile unit 120 that occupies more than one location 112 may be associated with a corresponding location area that includes each of those locations 112, rather than being associated with a single location 112.

In another embodiment of the present disclosure, there may be no 1:1 matching of a mobile unit 120 to a location 112 because more than one mobile unit 120 occupies a single location 112. This may be the case where, for example, the facility 100 is a warehouse and the location 112 is a shelf of a shelf rack in the facility 100. The shelf may be used by more than one mobile unit having its own tag. In this example, if multiple mobile units 120 are identified as occupying a single location 112, the program 128 may associate, in its records, the location 112 and its corresponding reader(s) 104 with each of the identified mobile units 120.

Figure 2A:
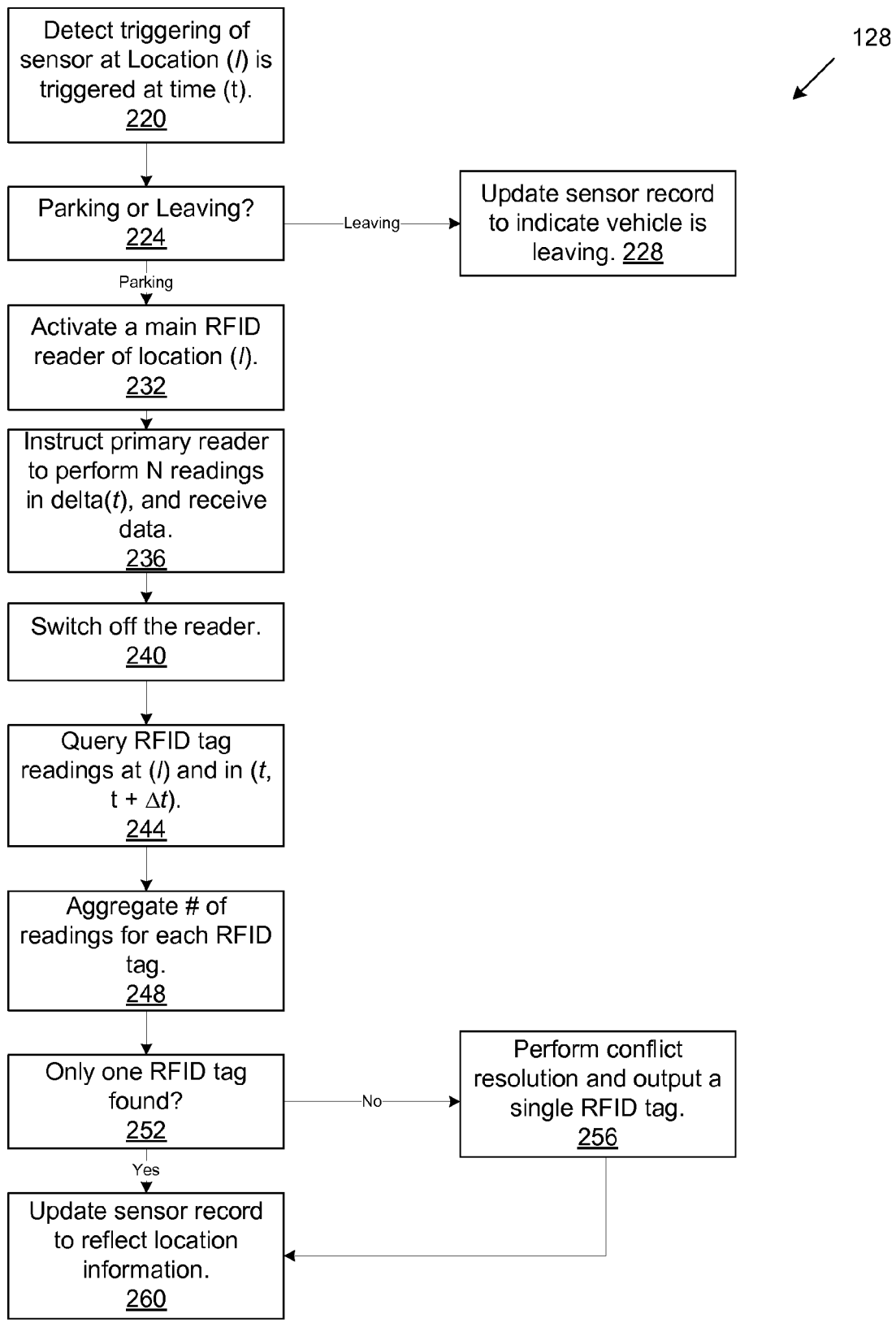
FIG. 2A is a flowchart depicting steps of a program of a computer system of the mobile housing facility depicted in FIG. 1, according to an aspect of the present disclosure.

FIG. 2A depicts steps of the program 128 according to an embodiment of the present disclosure, wherein the facility 100 is a vehicle parking facility, each mobile unit 120 is a vehicle such as a car or a motorcycle, each location 112 is a parking location, each sensor 108 is an infrared sensor, each reader is an RFID reader capable of reading an RFID tag ID associated with a vehicle, and the coverage areas 116 include one or more of the locations 112 in the facility 100. It shall be apparent to one of ordinary skill in the art that the functionality described in connection with FIG. 2A is not limited to the particular embodiment described in connection therewith.

In step 220 of the program 128, the program 128 detects that a sensor 108 at a location 112 is triggered. The triggering may be due to a movement by a vehicle 120 into or out of the location 112. The program 128 may receive data corresponding to such triggering from the sensor 108. For example, Sensor A may detect a movement by M1 120 (e.g., a vehicle) into or out of Location A. Sensor A may communicate a signal to the program 128 via the computer system 124 that Sensor A has been triggered. Upon Sensor A being triggered, the program 128 may note a time (t) at which Sensor A is triggered, in step 220.

In step 224, the program 128 may determine whether M1 120 is arriving at or leaving Location A 112. In one embodiment, this may be determined by referring to an electronic record associated with Location A 112 maintained or queried by the method program 128 on the computer system 124. The record may include, for example, the following information: IsOccupy (having values in set of {0,1}), Time, and CarRFID (corresponding to an RFID code of an RFID tag of M1 120). The IsOccupy property of the record may have an initial value of 0, indicating that Location A 112 is vacant, and may thereafter be changed to a value of 1 to indicate it is full. The record may be updated each time a vehicle is detected as parking or leaving Location A 112, as described below.

The determination, in step 224, of whether a vehicle is parking or leaving Location A 112 may be done, in this example, based on an existing value of the IsOccupy field. If it is 0, it is likely that Location A 112 was empty prior to the vehicle triggering the sensor in step 220. Accordingly, IsOccupy is set to 1. If IsOccupy is 1 prior to the triggering, it is likely that Location A 112 is full, and the vehicle M1 120 is now leaving Location A 112.

Upon the program 128 determining in step 224 that the vehicle triggering the sensor 108 in step 220 is leaving Location A 112, the program 128 may update the corresponding record in step 228, by setting IsOccupy to 0, noting the current time in Time, and setting CarRFID to null.

Upon the method program 128 determining in step 224 that the vehicle triggering Sensor A in step 220 is arriving (i.e., parking) at Location A 112, the program 128 may, in step 232, activate a primary RFID reader of Location A 112 in preparation for making a set of RFID readings for the arriving vehicle M1 120. The primary RFID reader of Location A 112 may be, for example, Reader A 104.

In step 236, the program 128 may communicate a command to Reader A 104 (the primary RFID reader at Location A 112) to cause Reader A 104 to perform N RFID tag readings for a predetermined amount of time, which may be referred to as Δt. For example, Δt may be 5 seconds after the time (t) at which Sensor A 108 is triggered, in step 220. N may be predetermined and/or configurable based, in part, on the amount of time available to perform a reading, and the reader's 104 capacity for and speed of performing readings during Δt. Reader A 104 may attempt to read an RFID tag of a vehicle in its coverage area 116A, and communicate results of the readings to the program 128. The program 128 may receive the communicated results.

Although an RFID tag of only the arriving vehicle M1 120 may be of interest to the program 128, other RFID tags in the proximity of M1 120 may register on the primary RFID reader, Reader A 104, during the readings performed as described above. One such RFID tag may be, for example, that of M2 120 at Location B 112. The RFID tag of M2 120 may be read by Reader A 104 because M2 120 and its RFID tag are in the coverage area 116A of Reader A 104. Consequently, under circumstances where more than one RFID tag is read by Reader A 104, the program 128 may identify the correct RFID tag of M1 120 by performing additional steps.

Upon the reader 104 performing N readings in Δt in step 236 and the program 128 receiving the results of in step 236, the program 128 may cause the primary RFID reader at Location A 108, i.e., Reader A 104, to switch off in step 240.

Upon switching off the primary reader, the program 128 may, in step 244, query the RFID readings it receives in step 236, and aggregate them in step 248 to determine what RFID tags were read, and how many times. It is possible for a given RFID tag to be read by the primary RFID 104 anywhere from 0 to N times. It is also possible that N different RFID tags are read in step 236.

The program 128 may determine, in step 252, whether all readings by the primary RFID reader 104 indicate the same RFID. A determination that only one RFID tag has been read (the one RFID tag may have been read N times or fewer), is a strong indication that one RFID tag in fact the RFID tag of the arriving vehicle (i.e., M1 120) at Location A 108. Consequently, the program 128 may identify the one RFID tag as the RFID tag of the arriving vehicle, and update the associated record of Sensor A 108 at Location A 112, in step 260, as follows: IsOccupy may be set to 1 (indicating it is now occupied); Time may be set to the trigger time (t); and CarRFID may be set to match the value of the arriving vehicle's RFID tag.

In a related embodiment, when determining whether all readings by the primary RFID reader 104 indicate the same RFID, in step 252, the program 128 may ignore one or more read RFIDs. The number of read RFIDs to be ignored may be configurable, and may further be defined as a threshold or range value. What value should be used may depend on several factors including, for example, the value of N. For example, if N is 10, the threshold value may be set to 2, such that where 8 out of 10 readings indicate the same RFID, the other two RFIDs are ignored, and the program 128 proceeds as though only the 8 identical RFIDs have been read. In another example, the program 128 may be configured to ignore any RFID that is read fewer times than a threshold value of 5.

Upon determining, in step 252, that more that one RFID tag has been read, the program 128 may determine that a conflict exists, such that it is not immediately apparent, without performing further analysis of the readings, which of the read RFID tags corresponds to the RFID tag of the arriving vehicle. Consequently, the program 128 may perform a conflict resolution step 256 to select a single RFID tag from amongst the multiple read RFID tags. This identified single RFID tag represents the program's 128 identification or determination of the actual RFID tag of the arriving vehicle, in competition with other RFID tags read by the primary RFID reader at Location A 112, i.e. Reader A 104. The selected RFID tag is used in step 260 to update the record of the sensor corresponding to Location A 112, as described above.

Figure 2B:
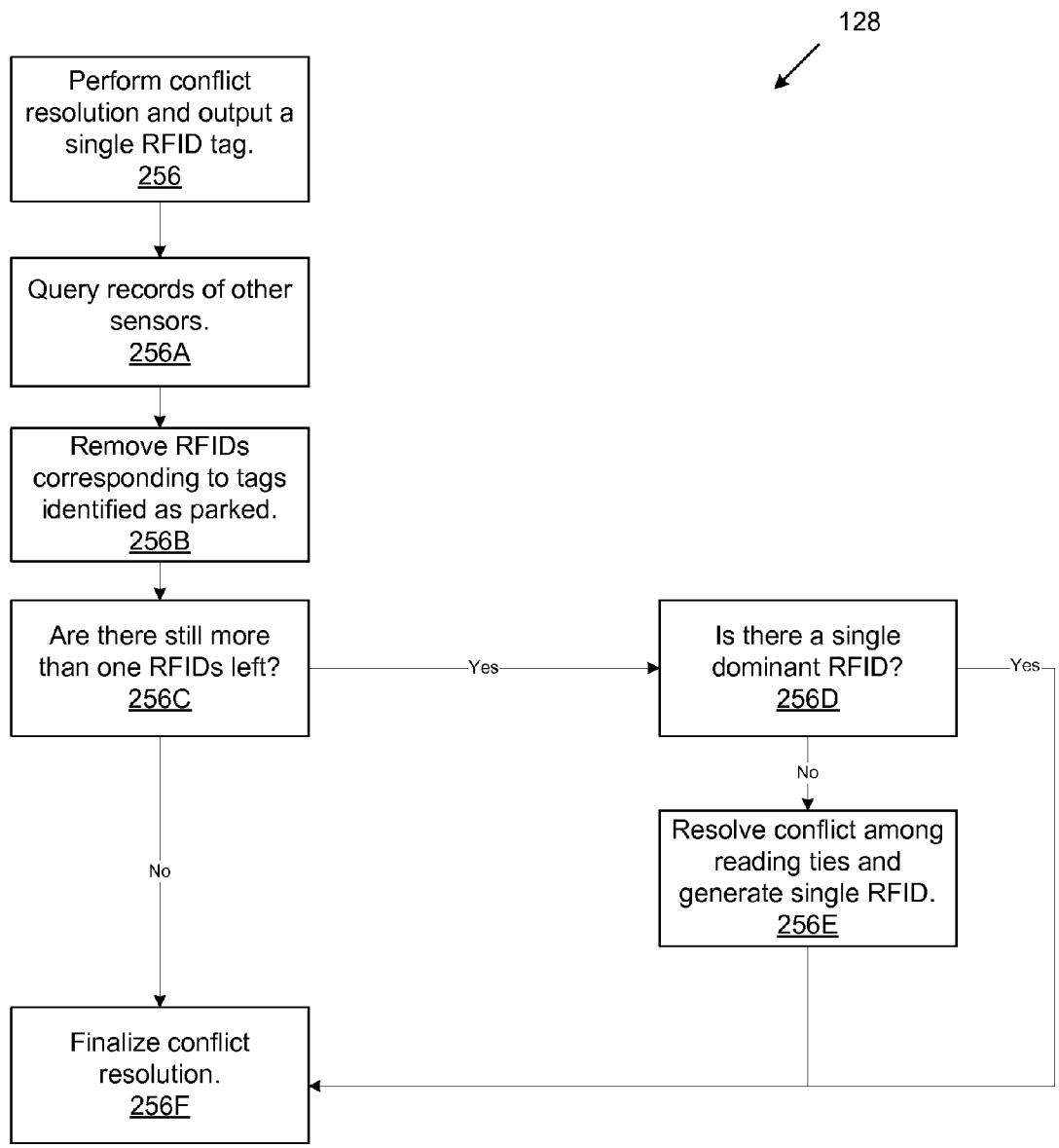
FIG. 2B is a flowchart depicting additional steps of the program depicted in FIG. 2A, according to an aspect of the present disclosure.

FIG. 2B depicts additional steps of the program 128, depicted in FIG. 2A, according to an exemplary embodiment of the present disclosure. These additional steps may be used by the program 128 to perform conflict resolution functions of step 256 of the program 128, to identify a single RFID tag from amongst multiple RFID tags read, as described in connection with FIG. 2A, above.

Accordingly, the program 128 may, in step 256A, query records of other readers 104 of the facility 100 that include Location A 112 in their respective coverage areas 116, to determine whether the queries records include any of the multiple RFID tags read in step 236. If any of the multiple RFID tags read in step 236 are included in a record of another reader 104, there is a strong indication that the corresponding RFID tag already has been detected as having entered another location 112, and that it does not correspond to an RFID tag of the vehicle M1 120 that triggers the sensor 108, detected in step 220 of the program 128.

Accordingly, in step 256B, the program 128 may remove from the table of read RFID tags any RFID tag that is recorded in the CarRFID field of any other reader's 104 record. The removal of such RFID tag from the table of read RFID tags ensures that any RFID tag belonging to a vehicle other than the arriving vehicle M1 120 is not mistakenly assigned to the records of the reader 104 corresponding to Location A 112. For example, if the primary RFID 104 at Location A 112 (e.g., Reader A 104) reads the RFID tag of a vehicle in a neighboring location (e.g., Location B 112 which may be a neighboring parking spot), the program 128 recognizes this and eliminates that RFID tag from its list of RFID tags received by program 128 in step 236.

Upon removing, in step 256B, RFID tags corresponding to RFID tags of already parked vehicles M 120 from its list/table of RFID tags received in step 236, the program 128 may determine, in step 256C, whether a resulting list (which is trimmed down) still contains more that one RFID tag. There are several reasons why more RFID tags may still be on the list at this point: for example, one or more vehicles M 120 may be passing by Location A 104 at the same time when the arriving vehicle M1 120 triggers Sensor A 108 at Location A 112. The primary RFID at this location, Reader A 104, may have read not only the RFID tag of the arriving vehicle M1 120, but also the RFID tags of other passing vehicles M 120, or, for example, a person carrying an RFID tag in the person's pocket as the person walks by Location A 112.

Upon determining, in step 256C, that there is only one RFID tag remaining on the list of read RFID tags, the program 128 may finalize, in step 256F, the conflict resolution step 256, having identified a single RFID tag as corresponding to the arriving vehicle M1 120 at Location A 112. The program 128 may thereafter proceed as described above with respect to step 256 in FIG. 2B, to update the record of Reader A 104 at Location A 112, in step 260.

In a related embodiment, the determination in step 256C that there is only one RFID tag remaining may be done based on ignoring a number of RFID tags remaining on the list. This may be accomplished by using a threshold value, whereby any RFID tag remaining on the list and having a read count fewer than the threshold value may be ignored and discarded.

If the program determines, in step 256C, that there is still more than one RFID tag remains on the list of read RFID tags, the program 128 may determine, in step 256D, whether there is a single dominant RFID tag, i.e. one that is read more than any other RFID tag on the list (the list potentially being shorter than it was prior to the step 256 commencing). If yes, the dominant RFID tag may be selected, and the conflict resolution may be finalized, in step 256F. If no (i.e., if there are ties between at least two RFID tags on the list of read RFID tags), the program 128 may perform a series of additional steps to resolve the tie, in step 256E.

The determination of whether a single RFID tag is dominant, in step 256D, may also be performed based on a threshold value. For example, if first RFID tag on the list of read RFID tags is to be identified as dominant over a second RFID tag on the list, the program 128 may require that the first RFID tag have a read count that is higher than the read count of the second RFID tag by a threshold value. For example, the first RFID tag may be required to have a read count that is higher than the read count of the second RFID tag by at least 5 reads. The threshold value may also be a percentage value (e.g., the read count of the first RFID may need to be 5% higher than that of the second RFID).

Figure 2C:
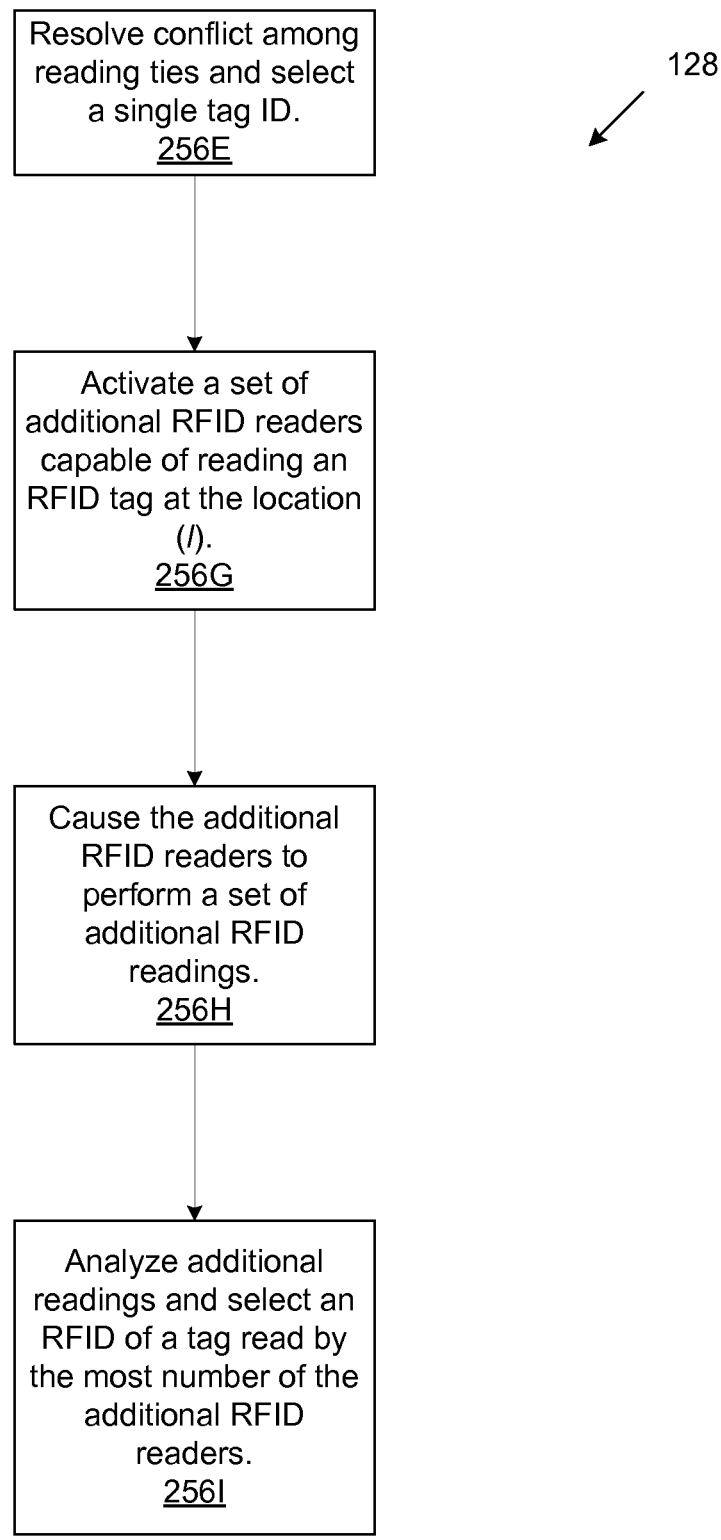
FIG. 2C is a flowchart depicting additional steps of the program depicted in FIG. 2B, according to an aspect of the present disclosure.

FIG. 2C is a flowchart depicting additional conflict resolution steps of the program 128 depicted in FIGS. 2A-B. In particular, these additional steps may include sub steps of step 256E depicted in FIG. 2B, whereby the program 128 may resolve a conflict among reading ties (i.e., a tie amongst two or more RFID tags in the list of RFID tags read in step 236; the list may have been shortened in step 256B), and to identify a single RFID tag as corresponding to the RFID tag of the arriving vehicle M1 120 at Location A 112. The program 128 may cause readers 104 to perform more accurate RFID tag readings at Location A 112. This may be desirable where previous steps of the program 128 may have resulted in a tie between at least two RFID tags in the list of RFID tags, the tied RFID tags both having been dominant on the list of read RFID tags (i.e., the tied RFID tags were read more than any other single RFID tag or set of RFID tags).

Accordingly, program 128 may, in step 256G, activate a set of additional RFID tag readers 104 capable of reading an RFID tag at Location A 112 (i.e., additional readers 104 whose coverage area 116 includes Location A 112).

The program 128 may cause the activated additional readers 104 to perform a set of additional RFID tag readings, in step 256H. The additional readers 104 may be, for example the RFID readers 104 of locations (1∓1), for example, two parking spots each flanking a different side of Location A 112. The number of the additional readers 104 and their proximity to Location A 112 may be configurable through the program 128, and may be variable for different locations 112. Performing additional readings in step 256H by the additional RFID readers 104 may be performed multiple times (as may be the case with other steps of the program 128). For example, if performing step 256H does not result in useful information that allows the program 128 to select a single RFID tag, then step 256H may be performed again, and the set of additional RFID readers 104 may be expanded or contracted or modified to take account of results of an earlier execution of the step 256H. Furthermore, the primary RFID reader 104 of Location A 112 need not be amongst the set of additional readers 104. The program 128 may receive the RFID tags read by the additional RFID readers 104, in step 256H. The results of the additional RFID tag readings by the additional RFID readers 104 are communicated by the additional RFID readers 104 and received by the program 128

Based on the results received from the additional RFID readers 104, the program 128 may, in step 256I, rank each RFID tag read by the additional RFID readers 104, based on how many RFID readers 104 have read that RFID tag. The program 128 may select an RFID tag from amongst the ranked RFID tags that is read by a highest number of the additional RFID readers 104. The selected RFID tag is the one most likely to belong to that of the arriving vehicle M1 120, since there is a lower likelihood that readers 104 in the set of additional readers 104 which can read an RFID tag at Location A 112 all would misread the RFID tag of the arriving vehicle M1 120.

In a related embodiment, before identifying an RFID tag, having been read by the highest number of RFID readers, as the RFID tag corresponding to the arriving vehicle M1 120, the program 128 may further require that the difference in the number of RFID readers 104 that have read that RFID tag and the number of RFID readers 104 that have read the next highest ranking RFID tag be greater than a threshold value. The choice of what threshold value is desirable may depend, in part, on the number of RFID readers 104 in the set of additional RFID readers 104, and the number of additional readings they perform. In one example, the threshold value may be 5, whereby an RFID tag is identified as being the RFID tag of an arriving vehicle M1 120 if it has been read by 5 more RFID readers 104 than any other read RFID tag.

Analyzing the additional RFID tag readings by the additional RFID readers 104 in step 256I may include querying records of the RFID 104 readers at locations 112 other than Location A 112 to eliminate RFID tags of already parked cars M 120. This may be done much the same way as in step 256B as described in connection with FIG. 2B.

Referring now to FIGS. 2A-C, in other embodiments of the present disclosure, the program 128 may additionally present the record associated with an RFID tag and/or a location (l) (e.g., Location A 112) to a recipient device (not shown). The recipient may be, for example, a display component of a ticket dispensing device, an automated payment processing device, a mobile telephone or tablet, or other device as described in connection with FIGS. 4-6, below. In one example, the recipient device may include a printer that prints information on a paper dispensed by the recipient device. The recipient device may be used by, for example, an operator and/or, for example, a driver of a vehicle M 120 to locate the vehicle M 120. For example, the recipient device may include an input mechanism (e.g., a keyboard or touch screen) that allows the recipient device to receive an RFID tag number. The recipient device may communicate the input RFID tag number to the computer system 124 (of which the recipient device may be a part) and/or the program 128. The program 128 may retrieve a record associated with such RFID tag, and provide the recipient device with corresponding information about a location 112 associated with the record of the RFID tag.

FIGS. 3A-C depict exemplary scenarios where embodiments of the present disclosure depicted in FIGS. 1-2C may be useful in meeting a challenge in tracking a mobile unit in a housing facility for mobile units. FIG. 3A depicts a vehicle M1 120 within a coverage area 116A of a Reader A 104, in the facility 100 depicted in FIG. 1. The vehicle M1 120 has an RFID tag having an ID {1111}. In the depicted example, the Reader A 104 may misread the RFID tag of the vehicle M1 120. FIG. 3A illustrates a common problem of a misread by a primary RFID Reader A 104 at a location (l) 112 (e.g., Location A 112), where a single reading may be inaccurate and unreliable. For example, the vehicle M1 120 may have an RFID tag {1111}, but Reader A 104 may read another RFID tag {2222}. By performing multiple readings during a time interval, as described, for example, in connection with the program 128 and FIGS. 2A-D, embodiments of the present disclosure may eliminate such false reads. If all reads are the same, chances that all of them are wrong is low. If one RFID tag appears more than others in the list of read RFID tags, it is likely that the most read RFID tag is the correct RFID tag of the arriving vehicle M1 120. And where there are ties, the tie breaking feature of the present disclosure discussed in connection with FIGS. 2C-D ensures that additional readings correct any possible errors in the first set of readings.

FIG. 3B an illustrative problem scenario including the vehicle M1 120 having an RFID tag {2222}. The vehicle M1 120 is in the coverage area of two readers 104, including the coverage area 116A of Reader A 104 and coverage area 116B of Reader B 104. In this example, without the benefits offered by embodiments of the present disclosure, both readers 104 may read the RFID tag of the same vehicle M1 120. This may be undesirable because the RFID tag and its corresponding vehicle M1 120 may preferably be associated with only one location or set of locations, but not another location. Embodiments of the present disclosure eliminate such errors because they activate a primary RFID reader 104 of the location (l) (e.g. Location A 112) only upon a sensor 108 of that location 112 detecting a vehicle M 120 arriving at or departing from the location (l) 112. Therefore, readers 104 of other locations are not turned on and will not track vehicles M 120 that are not entering or exiting corresponding locations and/or coverage areas 116A.

FIG. 3C depicts another example of a problematic scenario which may be avoided and/or corrected using embodiments of the present disclosure. The example of FIG. 3C includes two vehicle M 120: M1 and M5, having respective RFID tags {2222} and {3333}. FIG. 3C also includes an additional RFID tag of another mobile unit M6 which may be, for example, a natural person carrying an RFID tag. All three of these, M1, M5, and M6 120, may be within Reader A's 104 coverage area 116A. Without the benefit of embodiments of the present disclosure, Reader A 104 may read any of the three RFID tags in its coverage area 116A, and it will not be clear whether the reading is correct. This problem is solved by embodiments of the present disclosure, including, for example, the program 128 depicted in FIGS. 2A-D.

Figure 4:
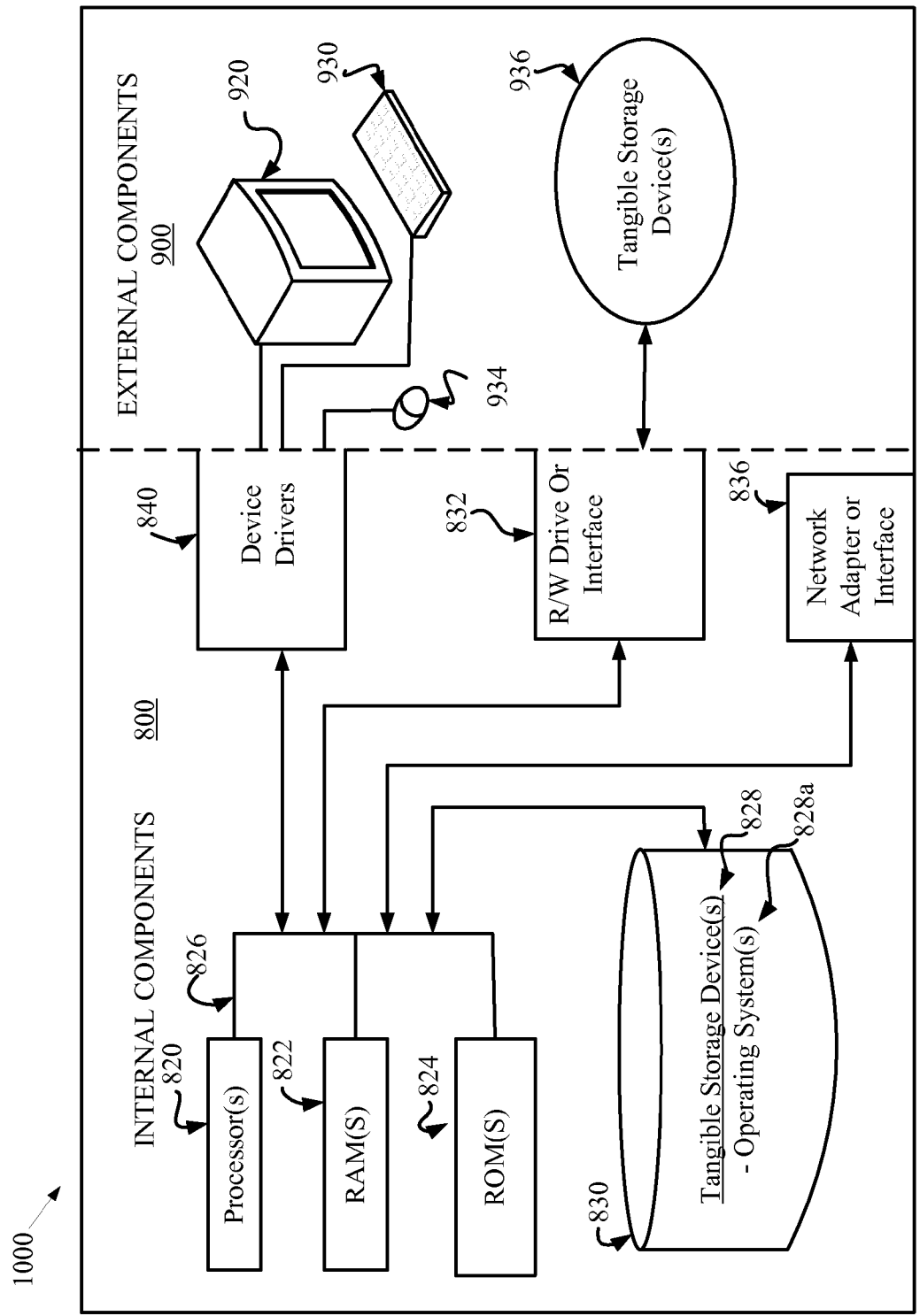
FIG. 4 is a schematic block diagram of a computer system, in accordance with embodiments of the present disclosure.

Referring now to FIG. 4, a computing device 1000 may include respective sets of internal components 800 and external components 900. The computing device 1000 may be or may include, for example, one or more computer systems 124 depicted in FIG. 1. Each of the sets of internal components 800 includes one or more processors 820; one or more computer-readable RAMs 822; one or more computer-readable ROMs 824 on one or more buses 826; one or more operating systems 828; one or more software applications 828a (e.g., device driver modules) executing the program 128 (FIG. 1); and one or more computer-readable tangible storage devices 830. The one or more operating systems 828 and device driver modules 829 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 5:
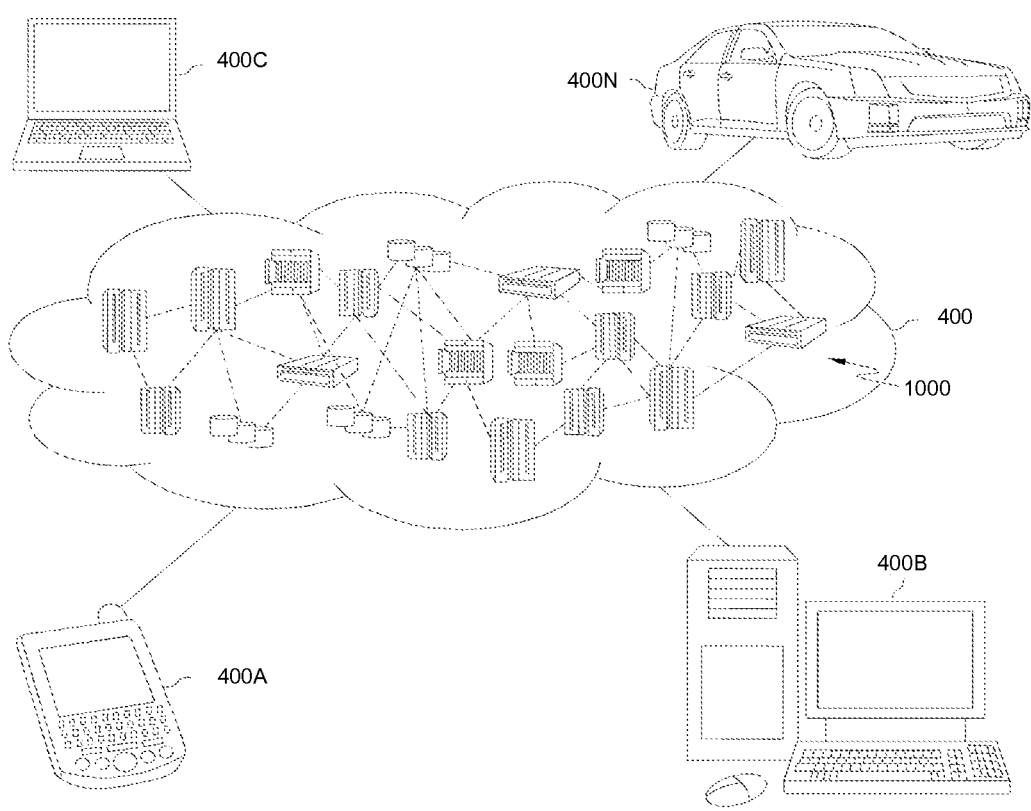
FIG. 5 is a schematic block diagram of an illustrative cloud computing environment, in accordance with embodiments of the present disclosure.

Referring now to FIG. 5, an illustrative cloud computing environment 400 is depicted. As shown, the cloud computing environment 400 comprises one or more cloud computing nodes, each of which may be a system 124 (FIG. 1) and/or a system 1000 (FIG. 4) with which local computing devices used by cloud consumers, such as, for example, a personal digital assistant (PDA) or a cellular telephone 400A, a desktop computer 400B, a laptop computer 400C, and/or an automobile computer system 400N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 400 to offer infrastructure, platforms and/or software as services for which a cloud consumer does not need to maintain resources on a local computing device. It is understood that the types of computing devices 400A-N shown in FIG. 5 are intended to be illustrative only and that the computing nodes 1000 and the cloud computing environment 400 can communicate with any type of computerized device over any type of network and/or network addressable connection (e.g., using a web browser).

Figure 6:
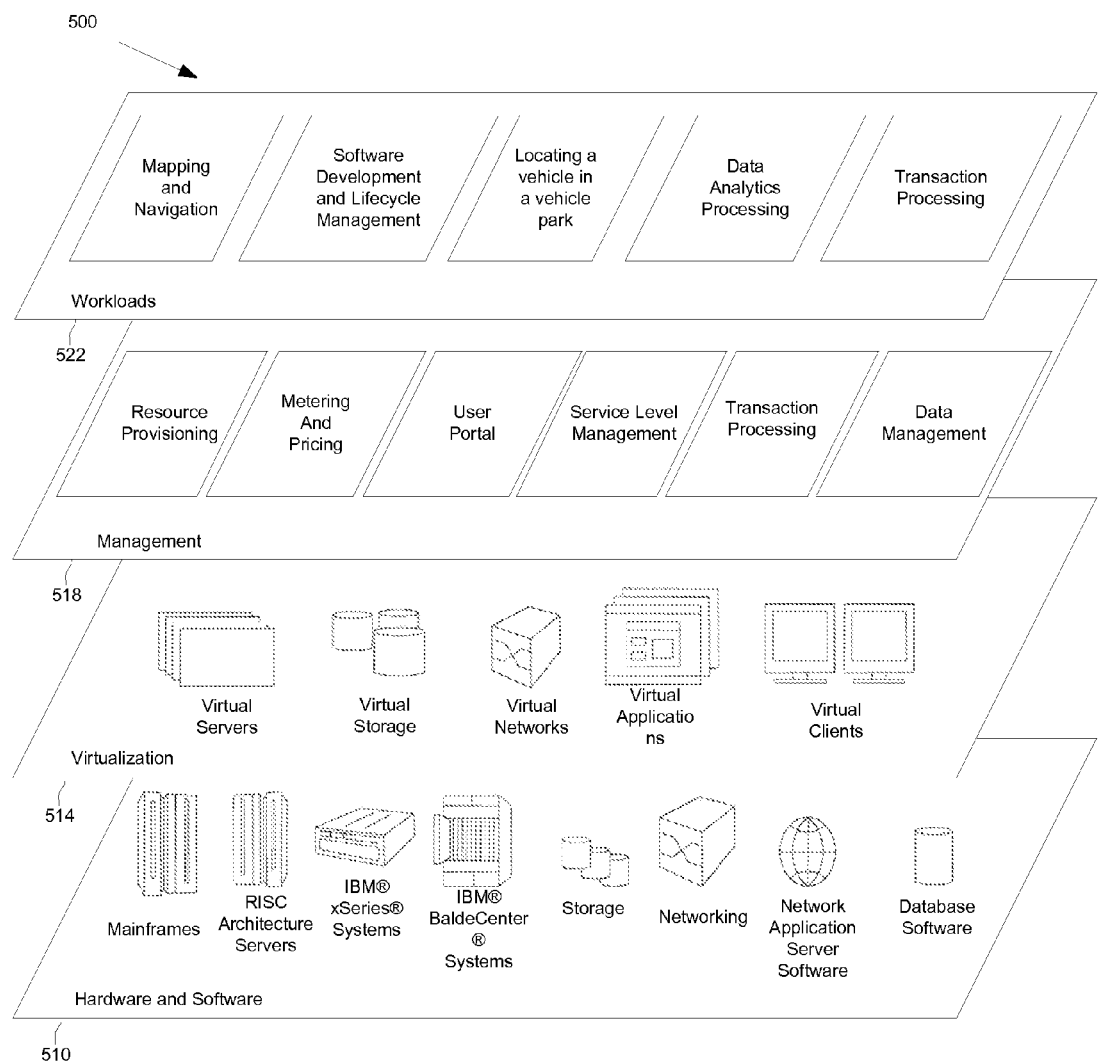
FIG. 6 is a multi-layered functional illustration of the cloud computing environment depicted in FIG. 5, in accordance with embodiments of the present disclosure.

Referring now to FIG. 6, a set of functional abstraction layers provided by the cloud computing environment 400 (FIG. 5) is shown. It should be understood in advance that the components, layers, and functions shown in FIG. 6 are intended to be illustrative only and embodiments of the invention are not limited thereto. As depicted, the following layers and corresponding functions are provided.

The hardware and software layer 510 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 514 provides an abstraction layer from which the following examples of virtual entities may be provided: virtual servers; virtual storage; virtual networks, including virtual private networks; virtual applications and operating systems; and virtual clients.

In one example, the management layer 518 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 522 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an automated vehicle locating component, such as that provided for by the program 128 (FIG. 1).

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer implemented method for tracking a mobile unit in a housing facility for mobile units, the method comprising:
   in response to receiving a signal from a detector associated with a first location, activating a first reading device having a reading range that includes at least the first location;
   receiving a first set of tag IDs from the first reading device, read during a first time interval; and
   in response to determining that one of the tag IDs in the first set of tag IDs can be associated with the first location, updating a record to record an association of the one tag ID with the first location;
   wherein the determining further comprises:
      in response to determining that one of the tag IDs in the first set of tag IDs cannot be associated with the first location,
      activating one or more second reading devices, each having a reading range that includes at least the first location, wherein the reading range of at least one of the second reading devices is different from the reading range of the first reading device;
      receiving a second set of tag IDs from the second reading devices read during a second time interval; and
      identifying a tag ID that is read by a highest number of the second reading devices and associating the identified tag ID with the first location.

2. The method of claim 1, wherein the determining comprises:
   determining that every tag ID in the first set of tag IDs corresponds to a same tag ID; and
   identifying any one of the tag IDs in the first set of tag IDs to associate with the first location.

3. The method of claim 1, wherein the determining comprises:
   determining that a tag ID in the first set of tag IDs appears more than any other tag ID in the set of tag IDs; and
   identifying the tag ID appearing more than any other tag ID in the first set of tag IDs to associate with the first location.

4. The method of claim 3, wherein the determining further comprises:
   eliminating from the first set of tag IDs any tag ID associated with any location other than the first location.

5. The method of claim 1, wherein determining that one of the tag IDs in the first set of tag IDs cannot be associated with the first location is based a number of instances of two or more of the tag IDs in the first set of tag IDs being within a threshold range.

6. The method of claim 1, further comprising:
   communicating the associated tag ID to a recipient device based on the record of the first location.

7. A computer system for tracking a mobile unit in a housing facility for mobile units, the system comprising:
- a computer having a processor and a tangible storage device; and
- a program embodied on the storage device for execution by the processor, the program having a plurality of program modules, the program modules including:
- an activating module configured to such that, in response to receiving a signal from a detector associated with a first location, the activating module activates a first reading device having a reading range that includes at least the first location;
- a receiving module configured to receive a first set of tag IDs from the first reading device, read during a first time interval; and
- an updating module configured such that, in response to determining that one of the tag IDs in the first set of tag IDs can be associated with the first location, the updating module updates a record to record an association of the one tag ID with the first location;
- wherein the updating module is further configured to:
- in response to determining that one of the tag IDs in the first set of tag IDs cannot be associated with the first location,
- activate one or more second reading devices, each having a reading range that includes at least the first location, wherein the reading range of at least one of the second reading devices is different from the reading range of the first reading device;
- receive a second set of tag IDs from the second reading devices read during a second time interval; and
- identify a tag ID that is read by a highest number of the second reading devices and associate the identified tag ID with the first location.

8. The system of claim 7, wherein the updating module is further configured to:
- determine that every tag ID in the first set of tag IDs corresponds to a same tag ID; and
- identify any one of the tag IDs in the first set of tag IDs to associate with the first location.

9. The system of claim 7, wherein the updating module is further configured to:
- determine that a tag ID in the first set of tag IDs appears more than any other tag ID in the set of tag IDs; and
- identifying the tag ID appearing more than any other tag ID in the first set of tag IDs to associate with the first location.

10. The system of claim 9, wherein the updating module is further configured to:
- eliminate from the first set of tag IDs any tag ID associated with any location other than the first location.

11. The system of claim 7, wherein determining that one of the tag IDs in the first set of tag IDs cannot be associated with the first location is based a number of instances of two or more of the tag IDs in the first set of tag IDs being within a threshold range.

12. The system of claim 7, wherein the program modules further include:
- a communicating module configured to communicate the associated tag ID to a recipient device based on the record of the first location.

13. A computer program product for tracking a mobile unit in a housing facility for mobile units, comprising a tangible storage device having program code embodied therewith, the program code executable by a processor of a computer to perform a method comprising:
- in response to receiving a signal from a detector associated with a first location, activating, by the processor, first reading device having a reading range that includes at least the first location;
- receiving a first set of tag IDs, by the processor, from the first reading device, read by the first reading device during a first time interval; and
- in response to determining, by the processor, that one of the tag IDs in the first set of tag IDs can be associated with the first location, updating a record, by the processor, to record an association of the one tag ID with the first location;
- wherein the determining further comprises:
- in response to determining, by the processor, that one of the tag IDs in the first set of tag IDs cannot be associated with the first location,
- activating, by the processor, one or more second reading devices, each having a reading range that includes at least the first location, wherein the reading range of at least one of the second reading devices is different from the reading range of the first reading device;
- receiving, by the processor, a second set of tag IDs from the second reading devices read by the second reading devices during a second time interval; and
- identifying, by the processor, a tag ID that is read by a highest number of the second reading devices and associating, by the processor, the identified tag ID with the first location.

14. The computer program product of claim 13, wherein the determining comprises:
- determining, by the processor, that every tag ID in the first set of tag IDs corresponds to a same tag ID; and
- identifying, by the processor, any one of the tag IDs in the first set of tag IDs to associate with the first location.

15. The computer program product of claim 13, wherein the determining comprises:
- determining, by the processor, that a tag ID in the first set of tag IDs appears more than any other tag ID in the set of tag IDs; and
- identifying, by the processor, the tag ID appearing more than any other tag ID in the first set of tag IDs to associate with the first location.

16. The computer program product of claim 15, wherein the determining further comprises:
- eliminating, by the processor, from the first set of tag IDs any tag ID associated with any location other than the first location.

17. The computer program product of claim 13, wherein determining, by the processor, that one of the tag IDs in the first set of tag IDs cannot be associated with the first location is based a number of instances of two or more of the tag IDs in the first set of tag IDs being within a threshold range.

\* \* \* \* \*